Aug. 23, 1949.　　　G. V. JOHNSON　　　2,479,623
LOAD POSITIONER

Filed Aug. 17, 1945　　　　　　　　　　　　6 Sheets-Sheet 1

Inventor:
George V. Johnson
By McCaleb, Wendt and Dickinson
Attys.

Aug. 23, 1949.  G. V. JOHNSON  2,479,623
LOAD POSITIONER

Filed Aug. 17, 1945  6 Sheets-Sheet 3

Inventor
George V. Johnson
By McCalet, Wendt & Dickinson
Attys.

Aug. 23, 1949.   G. V. JOHNSON   2,479,623
LOAD POSITIONER
Filed Aug. 17, 1945   6 Sheets-Sheet 4

Inventor
George V. Johnson
By McCaleb, Wendt & Dickinson
Attys.

Aug. 23, 1949.　　　　　G. V. JOHNSON　　　　　2,479,623
LOAD POSITIONER
Filed Aug. 17, 1945　　　　　　　　　　　　　6 Sheets-Sheet 6
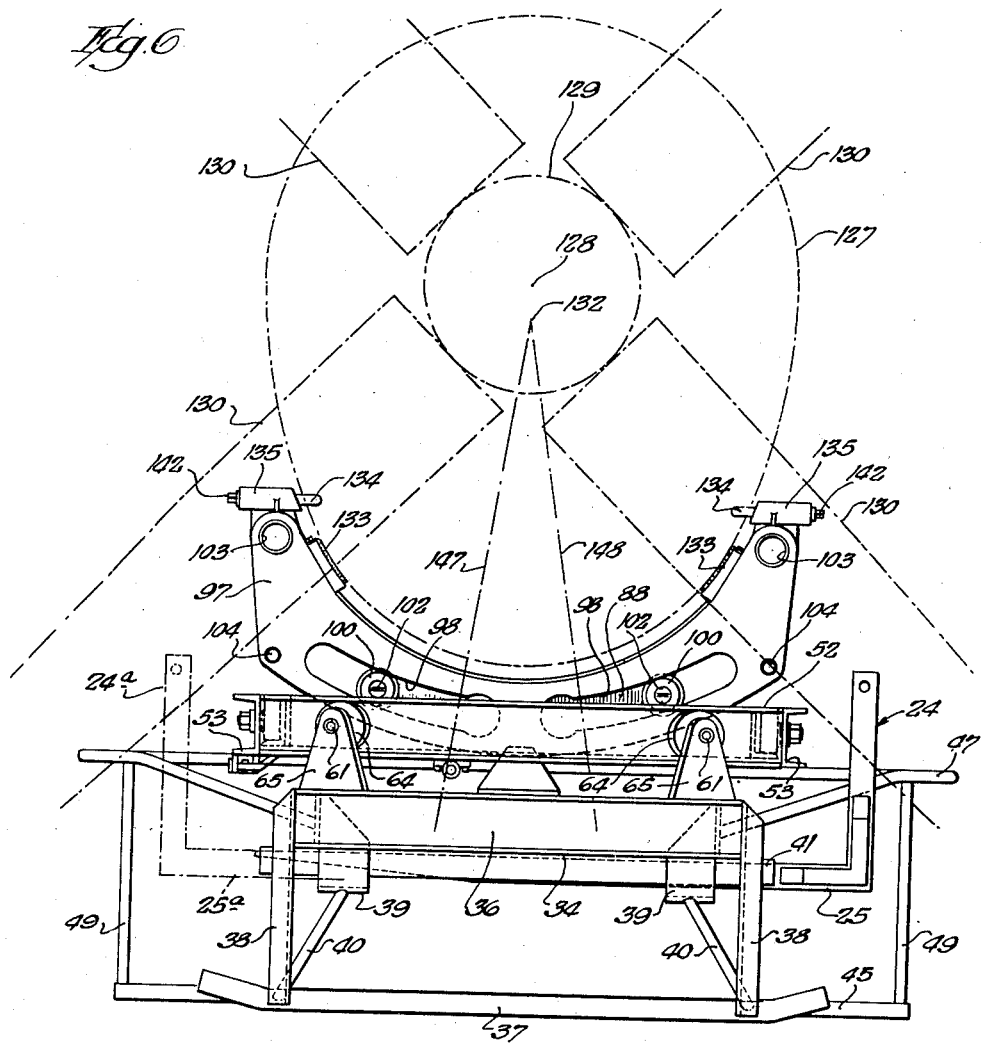
Fig. 6
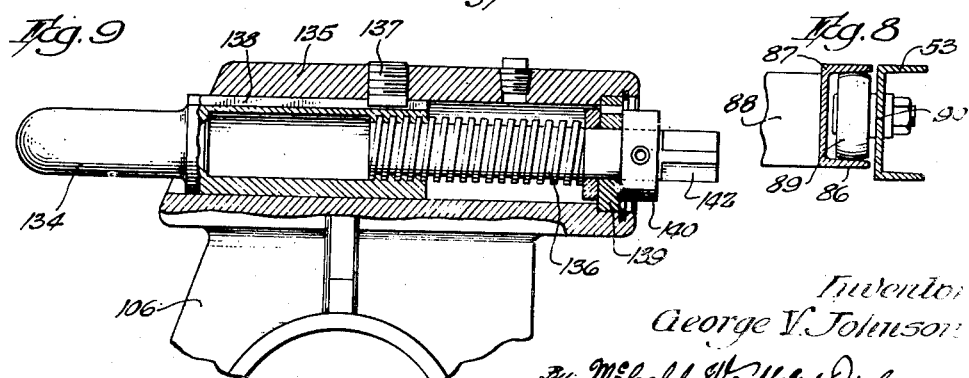
Fig. 9　　　　　　　　　　　　　　　　　Fig. 8
Inventor
George V. Johnson
By McCaleb, Wendt & Dickinson
Attys Patented Aug. 23, 1949

2,479,623

UNITED STATES PATENT OFFICE 2,479,623

LOAD POSITIONER

George V. Johnson, Portland, Oreg., assignor to Hyster Company, Portland, Oreg., a corporation of Oregon Application August 17, 1945, Serial No. 611,083

6 Claims. (Cl. 214—1)

This invention relates generally to load positioners and more particularly to such devices which are adapted to use in conjunction or association with industrial lift trucks and the like.

It is a general object of this invention to provide an improved load positioner adapted to the relatively precise and accurate placement of a given load and with which various linear and angular movements of the load may be accomplished with ease in chosen sequence and with comparative rapidity, even in instances where the load is heavy and/or bulky.

Another and more specific object is to provide a load positioner useable as a readily attachable accessory for industrial lift trucks and the like and wherein the general placement of the load is accomplished by movements of the truck and its associated elevator, while the more accurate and final adjustments of the load position are effected through the use of the load positioner.

The invention also has within its purview the provision of a load positioner for use in association with an industrial lift truck and wherein the load positioner and lift truck are relatively disposed for stable operation in the positioning of heavy loads.

As another object the present invention comprehends the provision of a load positioner adapted to use in association with an industrial lift truck and in a relation such that the load is adjustable by the load positioner relative to an axis lateral to the longitudinal axis of the lift truck; and supplemental to the lateral disposition of said axes, the flexibility of operation of the load positioner being enhanced for certain types of work by adaptation to quick and easy changeability of the support of the load positioner by the lift truck to either side of the positioner or its axis of adjustment.

Another object of the invention is to provide a load positioner adapted to be carried by an industrial truck and upon which a load may be firmly mounted for transportation from a point of supply to the place of mounting and then positioned for mounting without the delays and work entailed in transferring a load from one kind of apparatus to another.

It is also among the objects of the present invention to provdie a load positioner adapted to stable support from below, as contrasted to suspension from above and the like, and wherein the center of gravity of the load is carried close to the center of support.

This invention further comprehends the provision of a load positioner to which the load is connected at a distance from the center of gravity and supported thereby at other points.

In more structural detail, the purview of the invention includes the provision of a load positioner having a plurality of cooperating support frames, each of which is separately adjustable rotationally and/or linearly to effect accurate placement of a load.

A further object of this invention is to provide a manually controlled load positioner in which the operator and manual control elements are closely associated with the supported load.

As an instance of one of the many specific uses to which this invention is adapted, it is an object to provide a load positioner adapted to the mounting and dismounting of airplane engines relative to the plane structure.

Other objects and advantages of the invention will be apparent from the following description and the accompanying drawings, in which similar characters of reference indicate similar parts throughout the several views.

Referring to the drawings, of which there are six sheets:

Figs. 5 and 6 are respectively side and end elevational views of my load positioner wherein one type of load and certain features of the positioning adjustments are illustrated in dot-and-dash lines;

Fig. 7 is a fragmentary view partially in section, which illustrates one type of mechanism utilized in accomplishing one of the adjustments of the load positioner;

Fig. 8 is a fragmentary sectional view illustrating a detail of the support of one of the load positioner parts; and Fig. 9 is a fragmentary view with parts cut away to illustrate the construction of a part of the load positioner structure.

Although it is understood that a load positioner including the principles of my invention might be carried or supported by some other type of vehicle or structure, it has been found to operate very effectively when associated with an industrial lift truck. Having a view to such association in use, certain, but by no means all, of the features of the load positioner have been developed with certain characteristics of the usual types of industrial lift trucks in mind. On the other hand, many of the features of my invention are independent of the type of support with which the load positioner is associated in use and some of the features which are desirable in the association of the load positioner with a lift truck might very well be desirable in the use of the load positioner with some different type of support.

Figure 1:
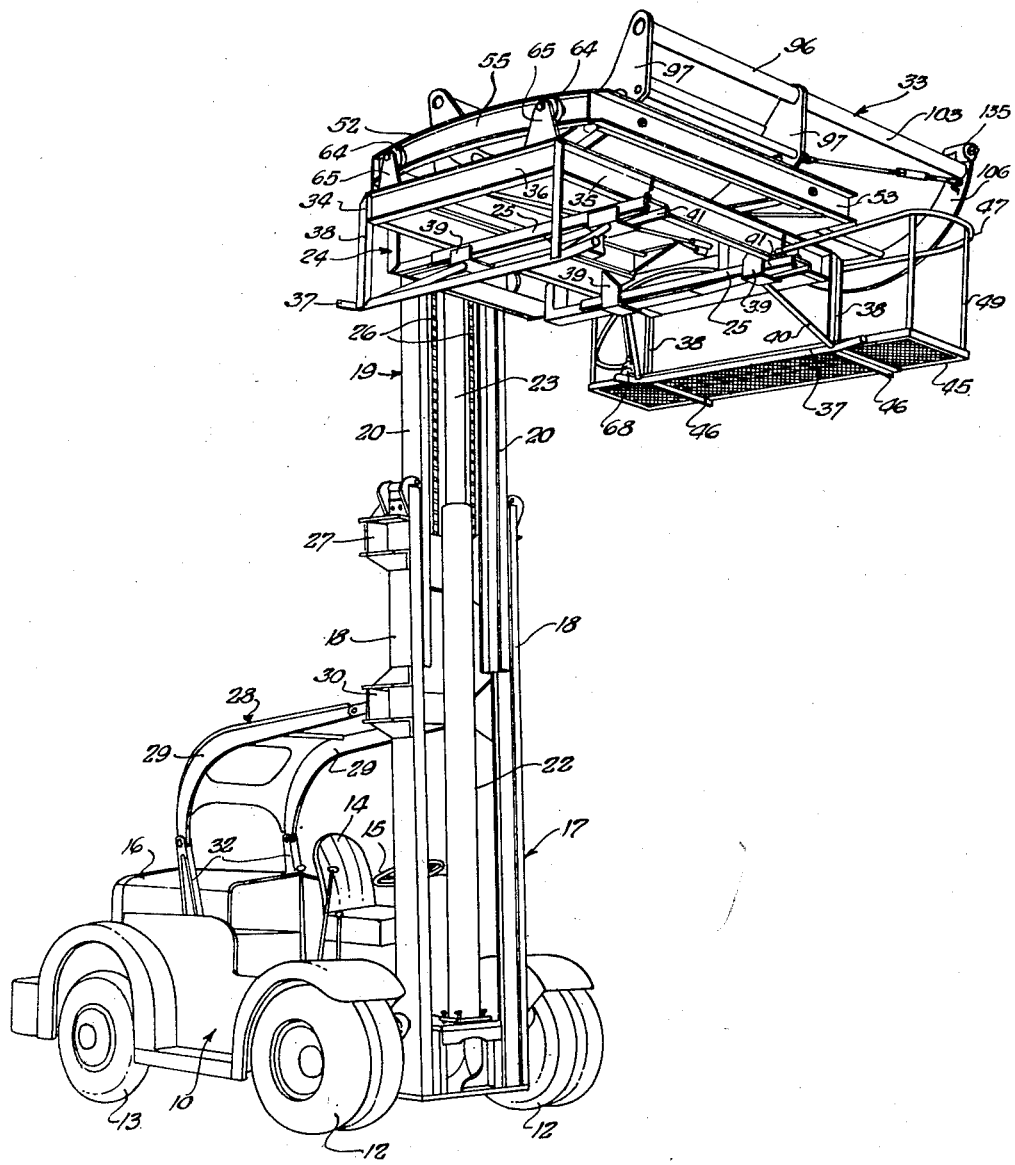
Fig. 1 is a perspective view illustrating a load positioner embodying my invention in a preferred form and shown in its preferred association with one type of industrial lift truck.

As an exemplary illustration, Fig. 1 depicts a preferred form of my load positioner mounted on one type of industrial lift truck. To facilitate the complete understanding of the invention and its operation in its disclosed association, the structure and operation of the lift truck will be briefly and generally described.

Referring to Fig. 1, the lift truck shown has a main body and frame structure 10 supported for movement on front and rear sets of wheels 12 and 13 respectively. Movements of the lift truck are controlled by an operator from an operator's seat 14 by controls which include a steering wheel 15. The operator's seat is disposed between a driving motor or engine covered by a hood 16 on the rear portion of the truck and a lift structure 17 mounted on the opposite or front end of the truck.

The lift structure 17 includes upright channels 18 which are carried by the main body and frame structure of the truck. An inner frame 19 having side members 20 is telescopically carried by the channels 18 for longitudinal movement relative thereto. Controlled movement of the inner frame 19 relative to the channels 18 is effected from the operator's position on the truck by the control of the flow of fluid under pressure to a hydraulic cylinder 22 having at its upper end a coacting piston rod 23. The lower end of the hydraulic cylinder 22 is carried by the main frame and body structure of the truck and the upper end of the piston rod 23 is secured to the upper structure of the inner frame 19 so that movements of the piston rod control the elevation of the inner frame.

An elevator 24 having laterally spaced load-carrying arms 25 projecting forwardly from the lift structure is carried by the inner frame 19 for movement relative thereto as the inner frame is either raised or lowered with respect to the channels 18. The weight of the elevator and its accompanying load are carried through flexible means such as chains 26, which chains have their lower ends anchored to a cross frame structure 27 at the top of the upright channels 18 and their upper ends secured to the elevator. Intermediate the ends, the chains 26 extend over pulleys (not shown) which are carried by the inner frame 19. Thus, at the same time that the inner frame 19 moves relative to the channels 18, the elevator moves with the inner frame and also relative thereto so that with a given movement of the inner frame, the elevator is moved between positions close to the ground and at the top of the extended lift structure.

The disclosed form of lift truck has a stabilizer and tilting mechanism 28 which includes curved arms 29 rotatably connected at their opposite ends to a cross member 30 secured to the upright channels 18 and to movable levers 32 on opposite sides of the truck body. The positions of the levers 32 being controlled mechanically, as by a power driven mechanism, and the lower end of the lift structure being supported for limited rotation, the angular disposition of the lift structure can be varied in a plane longitudinal of the truck.

Referring generally to the various views of the drawings, my preferred form of load positioner 33 is adapted to be carried by the elevator 24 of the disclosed industrial lift truck. Although there are many and varied uses for such load positioners, which uses may require certain variations in the fittings and load mounting structure, the disclosed embodiment of my invention is illustratively depicted in a form particularly adapted to the rather exacting use of positioning and mounting airplane engines on the plane. The inclusion of the disclosure of the adaptations to this particular use are made for the sake of completeness and clarity rather than with a view to any confining limitations.

Prior to the consideration of the more specific details of the load positioner structure and its construction, there are some broader aspects pertinent to the design which are worthy of note. For example, for the relatively exact positioning of a heavy load, a firm and stable support is desirable. Whether support from above or below, the supporting structure is desirably rigid and devoid of swinging suspensions. By use of the lift truck for this purpose, a firm and stable support is provided and in addition the support is not only adapted to the conveyance of the load from a source of supply or storage to its ultimate position of use, but the movements of the lift truck and its associated elevator may be utilized to advantage for the general and less exacting or preliminary positioning of the load.

To promote the operational stability of the entire load carrying and positioning unit when the load positioner is associated with a support such as an industrial lift truck, and to limit the weight of the load positioner without sacrificing the desired strength, the relation of the center of gravity of the load relative to the structure of the load positioner and its associated support is quite important. The center of gravity of the load should be near the axis of support for stability and should desirably be disposed above and with relative symmetry with respect to the main load supporting parts of the load positioner.

Naturally, the load positioner should have a size and strength commensurate with the load which is to be carried thereby. In most instances it is desirable that the positioner should be provided with means for definitely locating the load relative to the positioner parts. In addition to such considerations, it has been found desirable that the load and its positioning movements are related to an axis of adjustment. In the disclosed embodiment the axis of adjustment extends longitudinally of the load and passes substantially through the center of gravity. With the axis of adjustment related to the position of the center of gravity, improved stability of adjustment is attained. Also, in the present embodiment, the load positioner may be carried from either side by the lift truck for either left or right hand operation so as to suit the circumstances encountered in the particular positioning operation. In my preferred form of load positioner, an operator's platform is secured to one end thereof and the positioning controls are adjacent the platform to facilitate the ease and accuracy of operation of the positioner.

Considering the structure of my disclosed load positioner in greater detail, it includes a base frame 34 composed of substantially parallel side channels 35 and substantially parallel end channels 36 secured together and defining a rectangular support frame. By preference the base frame 34 has secured to its opposite ends support skids 37, the legs 38 of which are of a height such that the projecting arms 25 of the elevator of a lift truck may be easily and conveniently passed under the base frame to pick up the load positioner when it is standing on the ground. Substantially J-shaped channel members 39 are secured in opposed and spaced relation to opposite side channels 35 of the base frame and extend below the frame to provide definite passages through which the projecting arms 25 of the elevator are adapted to extend. Inverted channels 41 are secured to the side frame members 35 and extend through the J-shaped channels 39 to rigidify the base frame and provide a passage for the projecting arms 25 of the elevator. The J-shaped channels 39 and inverted channels 41 definitely locate the load positioner relative to the elevator and ensure the maintenance of that position. Braces 40 extend downwardly and outwardly from each of the channels 39 to the adjacent end portions of the skids 37 to brace the supporting structure.

Figure 3:
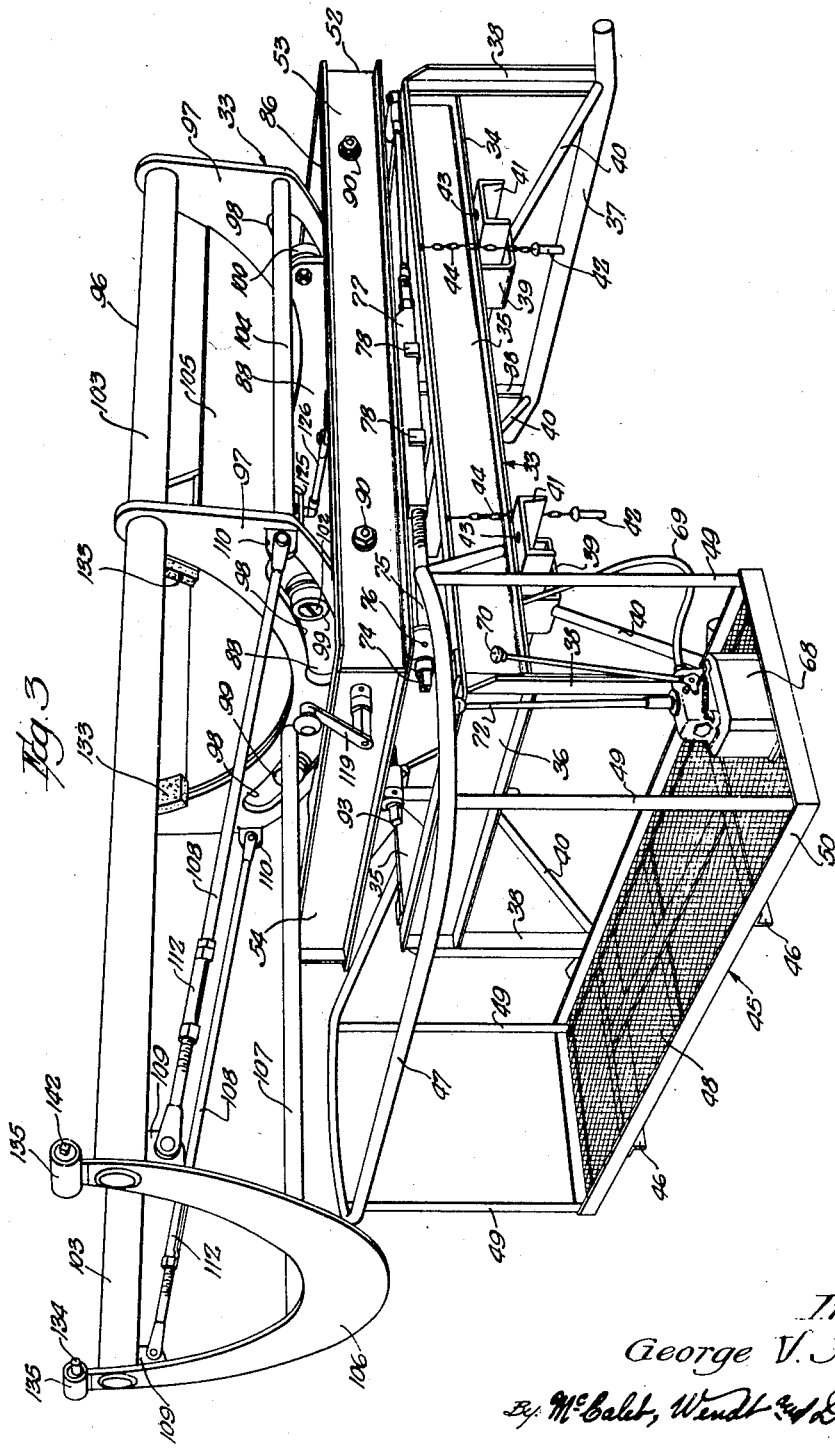
Figure 5:
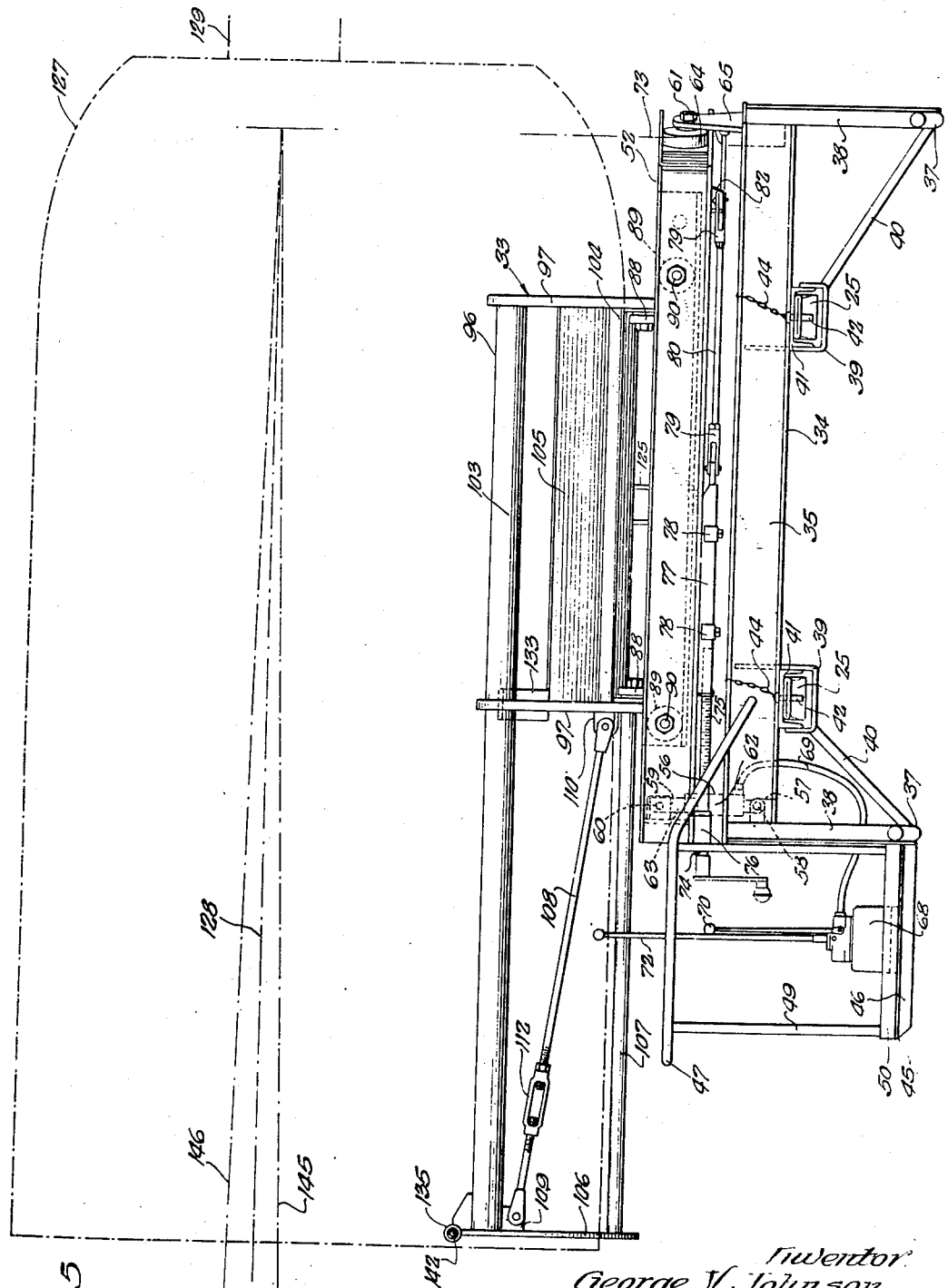

As a precaution against the undesired withdrawal of the projecting arms 25 of the elevator from the channels 39, locking pins 42 are adapted to be dropped into pin-receiving openings 43 in the ends of the channels 41 and aligned openings in the ends of the projecting arms adjacent the side channel 35 of the base frame, as shown in Fig. 5. Loss of the locking pins 42 is desirably prevented by suspending the pins from the side channel of the base frame by flexible supports such as chains 44, as shown in Fig. 3.

At one end of the base frame 34, an operator's platform 45 is secured to and carried by the base frame through angle strips 46 projecting outwardly from the lower ends of the adjacent legs 38 and through an upper formed guard rail 47 having its opposite ends secured to the side channels 35. The operator's platform 45 includes a foot grille 48 and upright corner posts 49 secured to a grille frame 50 and the upper guard rail 47.

A second support frame 52, having substantially parallel side channels 53 connected at one end by a straight channel 54 and at the other end by a substantially arcuate channel 55, is supported above the base frame 34 and is angularly adjustable relative to the base frame in two transverse planes. For accomplishing the adjustments of the second frame 52 relative to the base frame 34, the second frame is carried at one end relative to the base by an adjustable connection which, in the present instance, desirably comprises a hydraulic jack 56. At its lower end the jack 56 is connected to the inner surface of the end channel 36 of the base frame by a suitable bracket 57 and a cross pin 58 (Fig. 5). At its upper end the jack 56 is connected to the inner surface of the mid portion of the end channel 54 of the second frame by a suitable bracket 59 and a cross pin 60. Since the jack 56 includes a cylinder 62 and a piston rod 63 which are relatively rotatable with respect to one another, it provides one axis of relative movement for the second frame with respect to the base frame. Transversely disposed axes of movement are provided by the pins 58 and 60 through which the ends of the jack are connected to the base frame and second frame.

Figure 2:
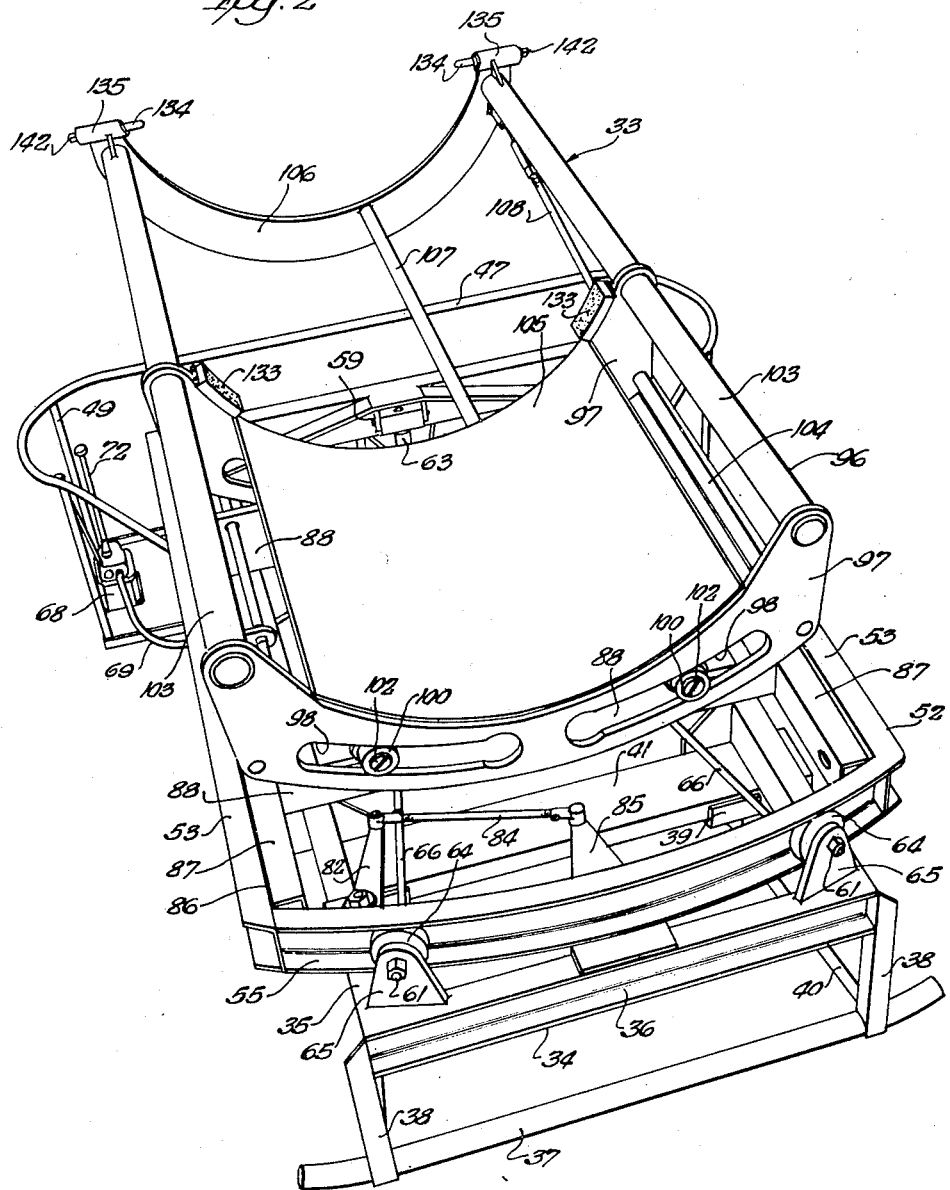
Figs. 2 and 3 are perspective views from different angular positions of the load positioner shown in Fig. 1.
Figure 4:
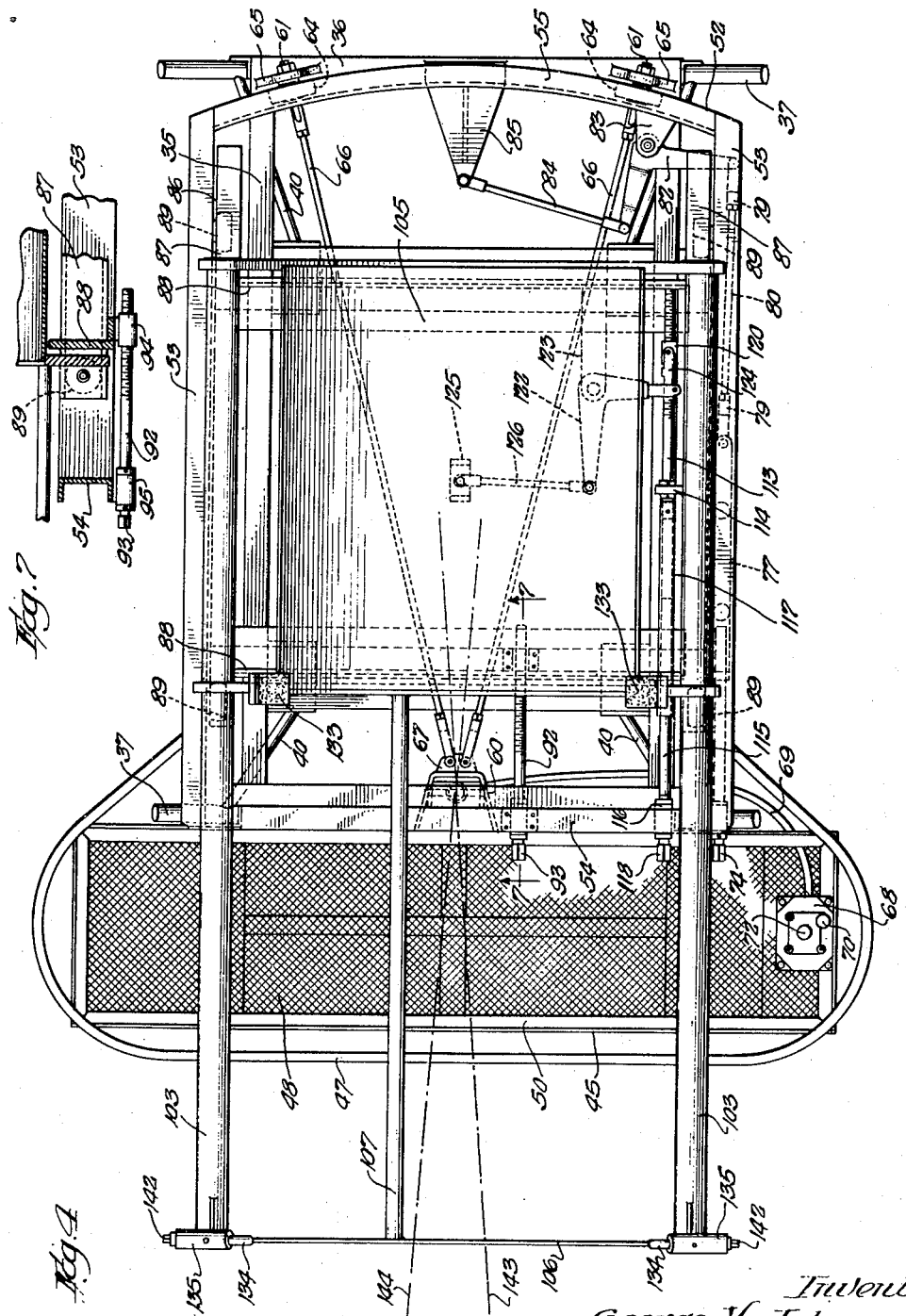
Fig. 4 is a top plan view of the load positioner shown in Figs. 1, 2 and 3.

At the end of the second frame 52, opposite the support provided by the jack 56, and as shown in Figs. 2, 4 and 5, rollers 64 are disposed between the side flanges of the arcuate channel 55 to support that end of the second frame relative to the base frame. Adjacent each roller 64 and secured to the base frame 34, is an upright support piece 65 which carries a trunnion 61 upon which each of the rollers is rotatably mounted above the base frame and near opposite corners of that frame.

By preference the axis of curvature of the arcuate end channel 55 is substantially coincident with the supporting axis of the jack 56 which carries the other end of the second frame. Also the rollers 64 are disposed in angular positions such that they are substantially tangent to the curvature of the arcuate end channel 55 and their rotational axes also converge at substantially the axis of support of the jack 56. Tie rods 66 have ends connected to the inner surface of the arcuate end channel 55 and extend radially inwardly therefrom; the other ends of those tie rods being connected to a bracket 67 on the inner surface of the straight channel 54 so that the tie rods angularly brace the second frame structure.

With the second frame 52 thus supported relative to the base frame 34, tilting or vertical swinging movement of the second frame relative to the base frame within predetermined limits of movement dependent upon the jack 56, is controlled by a hydraulic pump mechanism 68 mounted at one side of the operator's platform and connected to the jack through a suitable pressure line 69. A lever 70 on the hydraulic pump mechanism controls the direction of movement, while manual operation of a pump lever 72 determines the extent of movement.

In the instance of the tilting movement effected by operation of the hydraulic pump mechanism and its associated jack, the rollers 64 remain stationary and establish a lateral axis of tilting movement, the position of which is indicated by a dot-and-dash line at 73 in Fig. 5. Since the rollers 64 thus serve as stationary supports about which the second frame is tilted, their outer surfaces are desirably rounded axially of the rollers.

In addition to the vertical tilting movement, the second frame 52 may also be swung laterally relative to the base frame about the support axis of the jack 56 and with the other end of the second frame moving across the rollers 64. This lateral angular adjustment of the second frame is effected and controlled by a crank placed upon an adapter 74, shown in Figs. 3 and 4.

The adapter 74 for the crank which effects the lateral swinging movement of the second frame 52, is at one end of a threaded shaft 75 which shaft is rotatably carried by a bearing 76 on the under surface of the second frame 52. The threaded end of the shaft 75 which is remote from the adapter 74 is threaded into the end of a slide 77 movable longitudinally along the under surface of the side channel of the second frame 52 and supported relative thereto by guide channels 78, as shown in Figs. 3 and 5.

As shown in Figs. 4 and 5, the other end of the slide 77 is connected through suitable couplings 79 and a connecting rod 80 to one arm of a bell crank 82. Desirably the ends of the connector 80 are threaded into the couplings 79 so that the effective length of the connector is variable and adjustable. Also, the ends of the couplings 79 are rotatably connected to the slide 77 and to the bell crank arm to permit rotary movement of the bell crank 82 in response to linear movement of the slide 77 which is effected by rotation of the threaded shaft 75.

The bell crank 82 is rotatably supported by a bracket 83 secured to the inner surface of the arcuate channel 55. A connector 84 connects the other arm of the bell crank 82 to the inner end of a bracket 85 which is secured to and projects inwardly from the mid portion of the end channel 36 of the base frame. The ends of the connector 84 being rotatably connected to the bell crank arm and to the inwardly projecting bracket 85, rotary movement of the bell crank 82 effects lateral movement of the roller-supported end of the second frame relative to the base.

A third or roll frame 86 has substantially parallel side channels 87 connected intermediate their ends by cross trusses 88 and is disposed between the side channels 53 of the second frame in practically co-planar relationship therewith. As illustrated in Figs. 2, 4 and 8, the third or roll frame 86 is supported for linear movement longitudinally of the second frame 52 by rollers 89. Trunnions 90 secured to and projecting inwardly from the side channels 53 of the second frame 52 rotatably support the rollers 89 within the side channels 87 of the third frame, as shown in detail in Fig. 8.

As shown in detail in Fig. 7 and as more generally illustrated in Figs. 3 and 4, the longitudinal position of the third or roll frame relative to the second frame is controlled by rotation of a shaft 92 having a crank adapter 93 at one end adjacent the operator's platform and its other end threaded into a collar 94 which is secured to one of the cross trusses 88 of the third frame. A bearing 95 secured to the under-surface of the end channel 54 of the second frame rotatably supports the shaft 92 relative to that frame.

Supported above the third or roll frame 86 is a load-carrying frame or cradle 96 which comprises a third of the series of co-acting and separately adjustable supporting frames superimposed relative to one another and upon the base frame 34. The cradle 96 has a main load-carrying portion disposed between arcuately shaped end plates 97 and a longitudinally extended portion at one end thereof. By preference, the main load-carrying portion of the cradle 96 is disposed above the base frame 34 and the other or intermediate adjustable frames 52 and 86.

As depicted in Figs. 2 and 3, the end plates 97 of the cradle have therein and extending transversely thereof, arcuate slots 98 which provide arcuately disposed support surfaces. Pairs of laterally aligned flanged rollers 99 and 100 are rotatably mounted upon trunnions 102 carried by the cross trusses 88 of the third frame 86. The rollers of the pairs 99 and 100 are oppositely disposed with their flanges adjacent the inner surfaces of the plates 97 and their roller surfaces engaging the arcuate supporting surfaces of the plates 97 which are provided by the slots 98. Thus, the cradle 96 is supported for arcuate movement relative to the third or roll frame 87 about an axis disposed above the cradle 96 and the other adjustable support frames.

For the use to which the instant load positioner is adapted, the end plates 97 are connected at opposite sides and near the top by tie bars 103 and at lower positions by tie bars 104. Also, a floor plate 105 conforming to the upper curved surfaces of the plates 97 desirably extends longitudinally between the plates 97 and is secured thereto.

The tie bars 103 in the disclosed embodiment of my invention project longitudinally from one of the plates 97 to provide an end extension on the cradle. At their extending ends the tie bars are connected by a curved plate 106, which plate and the cradle extension are additionally braced by a tie bar 107 extending between the lower portion of one of the plates 97 and the lower portion of the curved plate 106. At the sides of the cradle extension, adjustable tie rods 108 extend angularly with respect to the tie bars 103 and have their ends connected to gussets 109 at the projecting ends of the tie bars and to lugs 110 projecting outwardly from the surface of the plate 97 below the tie bars. Turnbuckles 112 in the tie rods 108 are provided for adjustment of the length or tension of the tie rods.

Control of the position of the cradle relative to the third frame is effected in the disclosed embodiment of my invention by the turning of a shaft 113 which is journaled at one end in a bearing provided by a lug 114 projecting inwardly from the inner surface of the side channel 53 of the second support frame. As shown in Fig. 4, the turning of the shaft 113 is effected by the turning of an aligned shaft 115 which is journaled in a bearing 116 carried by the cross channel 54, the shafts 113 and 115 being drivingly connected by a tubular shaft 117 secured to the end of the shaft 113 and keyed for relative longitudinal movement to the shaft 115.

The shaft 115 is provided at its outer end adjacent the operator's platform with a crank adapter 118 which is adapted to have mounted thereon a crank such as 119 shown in Fig. 3. The extensible coupling between the shafts 113 and 115 is required to allow the longitudinal movement of the cradle 96 during the adjustment of the load position without disturbing the angular position of the cradle.

A collar 120 is threaded onto the end of the shaft 113 for longitudinal movement relative to the shaft effected by rotation of the shaft 115. A bell crank 122 is rotatably carried by a bracket 123 extending inwardly from one of the cross trusses 88 of the roll frame 86. One arm of the bell crank 122 is connected through a link 124 to the collar 120 so that the position of the collar longitudinally of the shaft 113 determines the angular position of the bell crank arms, the other arm of the bell crank being connected to a bracket 125 on the lower surface of the floor plate 105 through a connecting rod 126, as shown in Fig. 4. The position of the bell crank determines the angular position of the cradle 96.

As indicated in Figs. 5 and 6, the disclosed embodiment of my invention is particularly adapted to the positioning of an airplane engine and its associated nacelle with respect to the plane structure, the outline of the position of the nacelle being indicated in dot and dash lines at 127. The longitudinal thrust axis of the engine and propeller is indicated at 128, the propeller hub at 129, and the positions of the propeller blades at 130. The center of gravity of the combined engine and nacelle is located along an axis 132 which is somewhat below the thrust axis at 128. With respect to the axis 132, longitudinally of the engine and nacelle structure, the center of gravity is desirably disposed above the mid portion of the main load-carrying portion of the cradle 96 and above the mid portion of the base frame 34 and the elevator 24. With this disposition of the load on the load positioner, the effective weight of the load is concentrated over the mid portion of the main structure of the positioner and close to the load-carrying axis of the positioner support.

As indicated in Figs. 3, 4 and 6, pads 133 are secured to one of the plates 97 of the cradle adjacent the cradle extension for supporting the load which rests thereagainst. In order definitely to locate the load relative to the cradle 96, trunnions 134 are carried at the upper ends of the curved plate 106 by laterally disposed sleeves 135. The trunnions are adapted to fit into suitably disposed fixed openings in the load. To effect the placement and removal of the trunnions relative to the load, they are movable longitudinally of the sleeves 135 and adjustable by the rotation of a screw 136, the screw 136 being threaded into the inner end of each trunnion, as indicated in Fig. 9. Rotation of each of the trunnions is prevented by a key 137 which is slidable in a longitudinal groove 138 in the associated trunnion. The screw 136 is fixed axially of the sleeve and rotatably supported at one end thereof by a bearing 139 and an associated collar 140. The outer end of the screw desirably is provided with a crank receiving adapter 142.

Since it is understood that various other types of mechanisms might be devised for separately controlling the positions of the various adjustable load-carrying parts of the disclosed positioning mechanism, the more general aspects of the separate load adjustments will be discussed with respect to certain axes and angles of movement which are depicted in Figs. 4, 5 and 6. Starting with the adjustment of the angular position of the second or swing frame 52 laterally of the base, which is effected by rotation of a crank placed upon the adapter 74, the longitudinal axis of the load is angularly adjustable between positions indicated by the dot-and-dash lines 143 and 144 on opposite sides of a central line or plane and relative to an axis passing through supporting jack 56. The limits of tilting movement of the longitudinal load axis, which also depend upon angular movement of the second or swing frame 52 relative to the base frame 34 about an axis established by the rollers 64, are depicted in Fig. 5, by the dot-and-dash lines 145 and 146 which lie on opposite sides of a center line. The lateral angular adjustment is effected by the operation of the hydraulic pump 68 and jack 56.

It is pertinent to note that by virtue of the super position of the roll frame 86 and cradle 96 relative to the swing frame 52, the adjustment of the angular position of the swing frame 52 in either or both of the separate and transversely disposed planes of adjustment determines the angular position of the load and also varies the position of the axis of movement of the superimposed adjustable support frames.

Since the roll frame 86 moves along the inner surfaces of the side channels 53 of the swing frame 52, the linear movement of the load effected by operation of the threaded shaft 92 is along the axis established by the angular adjustments of the swing frame. For effecting stability of the operation of the load positioner particularly with respect to the adjustment of the cradle, the center of arcuate movement thereof desirably lies along an axis of adjustment above the cradle and passing through the center of gravity of the load which is indicated at 132 in Fig. 6. The limits of movement of the position of the cradle are indicated by dot-and-dash lines at 147 and 148 in Fig. 6. It may thus be understood that the preferred axis of adjustment extends longitudinally of the load and passes through the center of gravity thereof. This axis varies in its angular position due to the adjustments of the position of the swing frame, serves as a center of the arcuate movement of the cradle, and is parallel to the linear movement effected by the roll frame 86.

Since the load is carried on the pads 133 of the cradle 96 with the center of gravity disposed above the main load-carrying portion of the cradle, and the load is connected to the cradle through the trunnions 134 at the end of the cradle extension, the position of the load relative to the cradle may be adjusted to some extent by the control of the tension in the adjustable tie rods 108 by adjusting the turnbuckles 112.

In order to make clear the fact that the disclosed positioner is adapted to support from either side of the load and its axis of adjustment, the elevator and its associated projecting arms are indicated in solid lines at 24 and 25 in Fig. 6 in their normal position on one side of the load positioner. Indicated in dot-and-dash lines at 24a and 25a in Fig. 6, the elevator and its projecting arms are depicted in their normal positions on the opposite side of the load positioner.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States is:

1. A load positioner adapted to use in association with an industrial truck and comprising, in combination, a base frame adapted to be carried by the industrial truck, a second support frame supported at one end from the base frame through means providing laterally disposed rotational axes, said second support frame including at its opposite end an arcuate channel member having a center of curvature coincident with one of said laterally disposed rotational axes, means including rollers supported from the base frame and coacting with said arcuate channel for supporting said opposite end of the second support frame, means for swinging the second support frame relative to the base frame in one plane about said one of the laterally disposed rotational axes, means for moving said one end of the second support frame toward and from the base frame to tilt the second support frame with said rollers serving as fixed supports for the opposite end, a third support frame within the second support frame and including channels on opposite sides carried for longitudinal movement relative to the second support frame by rollers secured to the second support frame two sets of rollers having parallel axes, means secured to the third frame for supporting the last mentioned rollers, and a cradle having arcuate roller engaging surfaces and supported by said two sets of rollers for rocking movement relative to the third support frame, said cradle having load carrying means thereon.

2. A load positioner adapted to use in association with an industrial truck for accurately adjusting the position of a load in various directions related to an axis of adjustment passing near or through the center of gravity of the load in a direction transverse to the longitudinal axis of the truck and comprising, in combination, a base frame adapted to be supported from either side by the industrial truck, a swing frame having sides substantially parallel to said axis of adjustment and an arcuate channel member at one end, means providing a rotational support for the other end of the swing frame coincident with the axis of curvature of said arcuate channel, means for supporting said arcuate channel for swinging movement of the swing frame and axis of adjustment about said rotational support and laterally with respect to the base frame means for moving the rotationally supported end of the swing frame toward and from the base frame to tilt the swing frame and axis of adjustment about said means for supporting the arcuate channel, a roll frame, means for supporting the roll frame from the swing frame for linear movement relative to the swing frame and parallel to said axis of adjustment, a load carrying cradle and means supporting the cradle from the roll frame for rotational movement about said axis of adjustment.

3. A load positioner comprising, in combination, a base frame, support means secured to the base frame, an operators' platform secured to and carried by the base frame, and a plurality of superimposed position adjusting frames each separately adjustable relative to the base frame and in relation to an axis of load adjustment passing through the load, one of said adjusting frames being supported by the base frame through two separately adjustable means for determining the angular positions of the said one of the adjusting frames and said adjusting axis in two transverse planes relative to the base frame and about separated axes of angular movement, a second of said adjusting frames being carried by said one of the adjusting frames through support means and means for adjusting the position of the second adjusting frame linearly relative to said one of the adjusting frames and parallel to said adjusting axis, and a third of said adjusting frames being carried by the second of said adjusting frames through support means and means for determining the position of the third of said adjusting frames about said adjusting axis as a center.

4. A load positioner adapted to stable load supporting and positioning operation in association with an industrial lift truck having a load elevator at one end, said load positioner comprising a base frame adapted to be carried on the load elevator of the industrial lift truck, and a series of superimposed and separately adjustable load adjusting frames carried by the base frame and adapted to carry a load in a position such that the center of gravity of the load is above said load elevator, the adjustments of said series of frames being related to an axis of adjustment extending through the load in a direction lateral to the longitudinal axis of the truck, one of said adjusting frames being supported by the base frame through two separately adjustable means for determining the angular positions of the said one of the adjusting frames and said adjusting axis in two transverse planes relative to the base frame and about separated axes of angular movement, a second of said adjusting frames being carried by said one of the adjusting frames through support means and means for adjusting the position of the second adjusting frame linearly relative to said one of the adjusting frames and parallel to said adjusting axis, and a third of said adjusting frames being carried by the second of said adjusting frames through support means and means for determining the position of the third of said adjusting frames about said adjusting axis as a center.

5. A load positioner adapted to use with a load having a center of gravity displaced longitudinally from the geometric center and comprising, in combination, a base structure, a plurality of separately adjustable parts including a cradle having means thereon for supporting the load relative to the base structure with the center of gravity of the load disposed above the mid-portion of the base structure, means for connecting one of the parts to the base structure for movement relative thereto, means for connecting each of said parts to one of the others in load supporting and relatively movable relation to form a superimposed load supporting series, means for selectively and separately adjusting one of said parts angularly relative to the base in either of two transverse directions, means for adjusting another of said parts linearly relative to the base, and means for adjusting said cradle rotationally relative to the base, said cradle having an extension on one end to underlie said load at a distance from the center of gravity thereof, and means for connecting the load to the cradle extension.

6. In a load positioner the combination comprising a base, a pair of rollers, means for rotatably supporting said pair of rollers above and at one end of the base, support means at the other end of the base including transversely disposed rotational axes, the axes of said rollers intersecting at one of said rotational axes, an adjustable load carrying member supported at one end relative to the base by said support means and having means at the other end carried by said rollers, means for adjusting the position of said load carrying member relative to the base about said one of the rotational axes and laterally of said rollers, and means for tilting said load carrying member relative to the base with said rollers serving as fixed supports and thereby providing an axis of tilting movement.

GEORGE V. JOHNSON.

REFERENCES CITED

The following references are of record in the file of this patent:

UNITED STATES PATENTS

| Number | Name | Date |
| --- | --- | --- |
| 362,130 | Weir | May 3, 1887 |
| 803,586 | Ham | Nov. 7, 1905 |
| 837,364 | Wickes | Dec. 4, 1906 |
| 883,705 | Ferguson | Apr. 7, 1908 |
| 966,986 | Barnett et al. | Aug. 9, 1910 |
| 1,273,141 | Brosius | July 23, 1918 |
| 1,590,496 | Carr | June 29, 1926 |
| 1,600,835 | Manley | Sept. 21, 1926 |
| 1,693,335 | Damerell | Nov. 27, 1928 |
| 1,718,159 | Laronde | June 18, 1929 |
| 2,281,004 | Lehmann et al. | Apr. 28, 1942 |
| 2,318,791 | Mueller | May 11, 1943 |
| 2,335,572 | Schroeder | Nov. 30, 1943 |
| 2,362,991 | Dahl | Nov. 21, 1944 |